United States Patent
Kunert et al.

[11] Patent Number: 6,109,528
[45] Date of Patent: *Aug. 29, 2000

[54] ERGONOMIC HAND-HELD DATA TERMINAL AND DATA COLLECTION SYSTEM

[75] Inventors: Steven R. Kunert; Robert J. Traeger, both of Cedar Rapids, Iowa; Paul Beard, Milpitas, Calif.; Robert J. Grabon; John K. Rohde, both of Cedar Rapids, Iowa

[73] Assignee: Intermec IP Corp., Woodland Hills, Calif.

[*] Notice: This patent is subject to a terminal disclaimer.

[21] Appl. No.: 08/772,274

[22] Filed: Dec. 20, 1996

Related U.S. Application Data

[60] Provisional application No. 60/009,291, Dec. 22, 1995.

[51] Int. Cl.[7] .................................................. G06K 7/10
[52] U.S. Cl. ............................. 235/472.01; 235/462.45; 235/462.47; 361/686
[58] Field of Search ...................... 235/472.01, 472.02, 235/462.45, 462.46, 462.47, 454; 361/686, 683, 749

[56] References Cited

U.S. PATENT DOCUMENTS

| | | | |
|---|---|---|---|
| 4,281,404 | 7/1981 | Morrow, Jr. et al. | 367/108 |
| 4,983,818 | 1/1991 | Knowles | 361/472.01 |
| 5,059,778 | 10/1991 | Zouzoulas et al. | 235/472.01 |
| 5,175,672 | 12/1992 | Conner et al. | 361/680 |
| 5,305,181 | 4/1994 | Schultz | 361/680 |
| 5,349,497 | 9/1994 | Hanson et al. | 235/472.01 |
| 5,357,065 | 10/1994 | Mitamura et al. | 200/5 A |
| 5,406,063 | 4/1995 | Jelen | 235/472 |
| 5,410,141 | 4/1995 | Koenck et al. | 235/472.01 |
| 5,418,684 | 5/1995 | Koenck et al. | 235/472.02 |
| 5,477,044 | 12/1995 | Aragon | 235/472.01 |
| 5,489,770 | 2/1996 | Kadota et al. | 235/472.01 |
| 5,506,394 | 4/1996 | Plesko | 235/462.46 |
| 5,543,609 | 8/1996 | Giordano et al. | 235/462.43 |
| 5,581,492 | 12/1996 | Janik | 361/683 |
| 5,587,577 | 12/1996 | Schultz | 235/462.44 |
| 5,610,387 | 3/1997 | Bard et al. | 235/462.44 |
| 5,610,602 | 3/1997 | Hargreaves | 341/22 |
| 5,615,088 | 3/1997 | Mizumo | 361/749 |
| 5,657,201 | 8/1997 | Kochis | 235/472.01 |
| 5,679,943 | 10/1997 | Schultz et al. | 235/472.02 |
| 5,715,140 | 2/1998 | Sinkunas et al. | 361/690 |
| 5,736,726 | 4/1998 | Vanhorn et al. | 235/472.01 |
| 5,742,480 | 4/1998 | Sawada et al. | 361/479 |
| 5,801,918 | 9/1998 | Ahearn et al. | 235/472.01 |
| 5,969,328 | 10/1999 | Kunert | 235/472.01 |

FOREIGN PATENT DOCUMENTS

| | | |
|---|---|---|
| 2-306385 | 1/1989 | Japan . |
| WO 88/02520 | 4/1988 | WIPO . |
| WO 90/16033 | 12/1990 | WIPO . |

*Primary Examiner*—Donald Hajec
*Assistant Examiner*—Daniel St. Cyr
*Attorney, Agent, or Firm*—Suiter & Associates

[57] ABSTRACT

A portable hand-held data terminal having a curvilinear cross-sectional keypad capable of operation by one hand. In an exemplary embodiment of the invention the keys may extend to various heights above the keypad depending on their function. For example, a scan trigger key may extend the farthest from the terminal, numeric keys may extend the next farthest, and alphabetic keys may extend the least. The data terminal may also provide a quick release pistol grip to terminal attachment which utilizes, in an exemplary embodiment, a pair of removably receivable compressible O-rings, a pair of removably receivable guides, and a lever-type latch mechanism. The invention may also provide an interface between the pistol grip assembly's trigger mechanism and the data terminal which does not require that the housing of the data terminal be pierced. In an exemplary embodiment this interface utilizes a reed switch, mounted inside the data terminal's housing, and a magnetic trigger assembly wherein the reed switch is held closed by the magnet when the trigger is depressed.

7 Claims, 6 Drawing Sheets

ERGONOMIC HAND-HELD DATA TERMINAL AND DATA COLLECTION SYSTEM

CROSS REFERENCE TO RELATED APPLICATION

The present application is a complete application of U.S. Provisional Application Ser. No. 60/009,291 filed on Dec. 22, 1995.

The present application incorporates herein by reference the following: U.S. patent application Ser. No. 08/436,908 filed May 8, 1995 (Davis et al 38120); U.S. patent application Ser. No. 08/533,633 filed Sep. 25, 1995 (Kunert 38121X); U.S. patent application Ser. No. 08/481,655 filed Jun. 7, 1995 (Kunert 38122); U.S. patent application Ser. No. 08/466,824 filed Jun. 6, 1995 (Kunert 38165); U.S. patent application Ser. No. 08/482,643 filed Jun. 7, 1995 (Kunert 38167); U.S. patent application Ser. No. 08/690,210 filed Jun. 25, 1996 (Kunert 38175R1); U.S. patent application Ser. No. 08/515,021 filed Aug. 14, 1995 (Kunert et al 38185); U.S. patent application Ser. No. 08/752,452 filed Nov. 15, 1996 (Kunert 38195R1); U.S. Provisional Patent Application Ser. No. 60/031,235 filed Nov. 14, 1996 (Kunert 38251P1); U.S. Provisional Patent Application Ser. No. 60/029,088 filed Oct. 22, 1996 (Kunert 38274P1); and U.S. Provisional Patent Application filed Dec. 6, 1996 with Express Mail Label EM 073 734 152 US (Kunert 38274P2).

TECHNICAL FIELD

The present invention relates generally to portable hand-held data terminals and specifically to portable hand-held data terminals having alpha-numeric keypads and removable pistol grip assemblies.

BACKGROUND OF THE INVENTION

Portable hand-held data terminals enjoy a variety of uses in many different industries. A desirable characteristic of these data terminals is that they must be convenient to operate by a user while he is engaged in performing other, more demanding tasks. Specifically, a user may find it necessary to operate the data terminal with one hand, thus leaving his other hand free. For example, the user of a data terminal equipped with a optical character set reader, may find it desirable to lift or otherwise shift small items of inventory with one hand while simultaneously operating the data terminal's optical character set reader to scan an optical character set affixed to that item. Likewise, it may be desirable to mate a data terminal equipped with a optical character set reader with a removable pistol grip assembly. The pistol grip assembly's trigger mechanism must be mechanically or electrically connected to the data terminal so that the user, by depressing the trigger, may command the data terminal's optical character set reader to scan a target. However, data terminals must capable of operating in severe, often hostile environments. Thus it is desirable for these data terminals to have environmentally sealed housings to prevent damage to their internal electronic components. Consequently, means of connecting the pistol grip assembly's trigger mechanism through an environmentally sealed housing may prove to be expensive to manufacture and difficult to design.

SUMMARY OF THE INVENTION

The present invention teaches an ergonomic, rugged, yet lightweight hand-held data terminal with integrated data collection. The terminal of the present invention is particularly adapted for comfortable and uninterrupted use in data collection activities with a data collection system.

The terminal preferrably has a vertical format with a size and shape particularly designed to be operably carried by a single hand of a user. The terminal of an exemplary embodiment of the present invention may be configured for a full or partial alphanumeric keyboard input.

In an exemplary embodiment the terminal of the present invention is capable of being configured and operated in both batch mode and as a radio frequency (RF) terminal having real-time data capability in a client/server architecture application. Additionally, in an exemplary embodiment the hand-held data terminal of the present invention may run "plug and play" terminal emulations. Optical character set reading operation may be achieved via an integrated or tethered reader.

Therefore, an object of the present invention is to provide a portable hand held data terminal having a curvilinear cross-sectional keypad wherein the keys of the keypad may extend through the keypad to various heights. For example, a scan trigger key may extend the farthest from the terminal, numeric keys may extend the next farthest, and alphabetic keys may extend to least.

Another object of the present invention is to provide a quick release pistol grip to terminal attachment which utilizes, in an exemplary embodiment, a pair of removably receivable compressible O-rings, a pair of removably receivable guides, and a lever-type latch mechanism.

A further object of the present invention is to provide an interface between a pistol grip assembly's trigger mechanism and the data terminal which does not require that the housing of the data terminal be pierced. In an exemplary embodiment this interface utilizes a reed switch, mounted inside the data terminal's housing and a magnetic trigger assembly wherein the reed switch is held closed by the magnet when the trigger is depressed.

The present invention provides a portable hand-held data terminal having a curvilinear cross-sectional keypad capable of operation by one hand. In an exemplary embodiment of the invention the keys may extend to various heights above the keypad depending on their function. For example, a scan trigger key may extend the farthest from the terminal, numeric keys may extend the next farthest, and alphabetic keys may extend to least. The keys may be mounted on a circuit board having the same curvilinear cross-section as the keypad. This circuit board may be either rigid or flexible.

The present invention may also provide a quick release pistol grip to terminal attachment which utilizes, in an exemplary embodiment, a pair of removably receivable compressible O-rings, a pair of removably receivable guides, and a lever-type latch mechanism. An interface between the pistol grip assembly's trigger mechanism and the data terminal which does not require that the housing of the data terminal be pierced may also be provided. In an exemplary embodiment, this interface utilizes a reed switch, mounted inside the data terminal's housing and a magnetic trigger assembly wherein the reed switch is held closed by the magnet when the trigger is depressed.

These and other features, aspects, and advantages of the present invention will become better understood with regard to the following description, appended claims, and accompanying drawings.

DETAILED DESCRIPTION OF THE INVENTION

Figure 1:
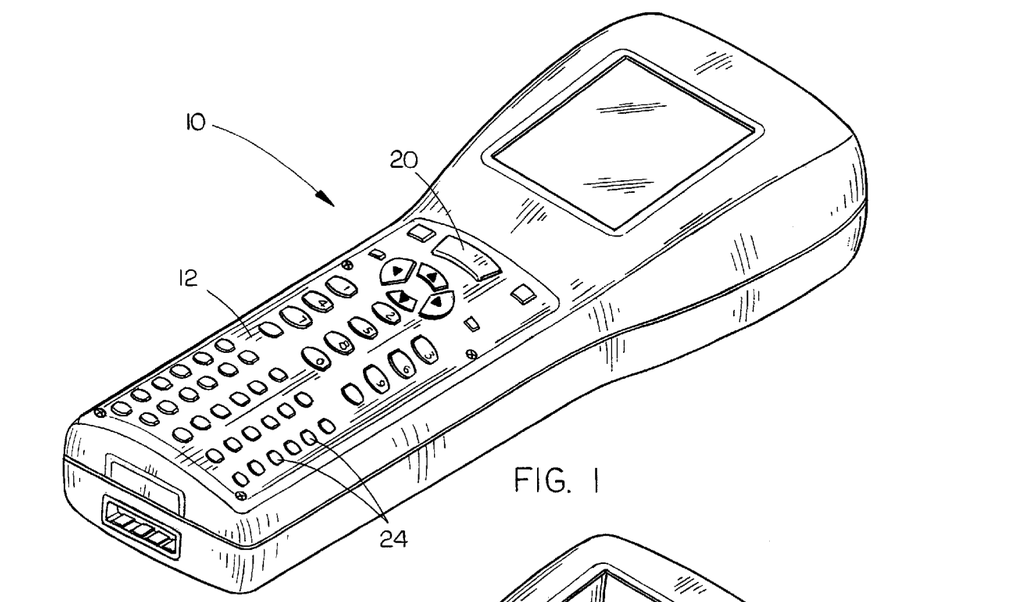
FIG. 1 is a pictorial view of a portable hand-held data terminal featuring a keypad having a curvilinear cross-section.

FIG. 1 is a pictorial view of an exemplary embodiment of the present invention illustrating a portable hand-held data terminal 10 which comprises a keypad 12 having a curvilinear cross-section.

Figure 2:
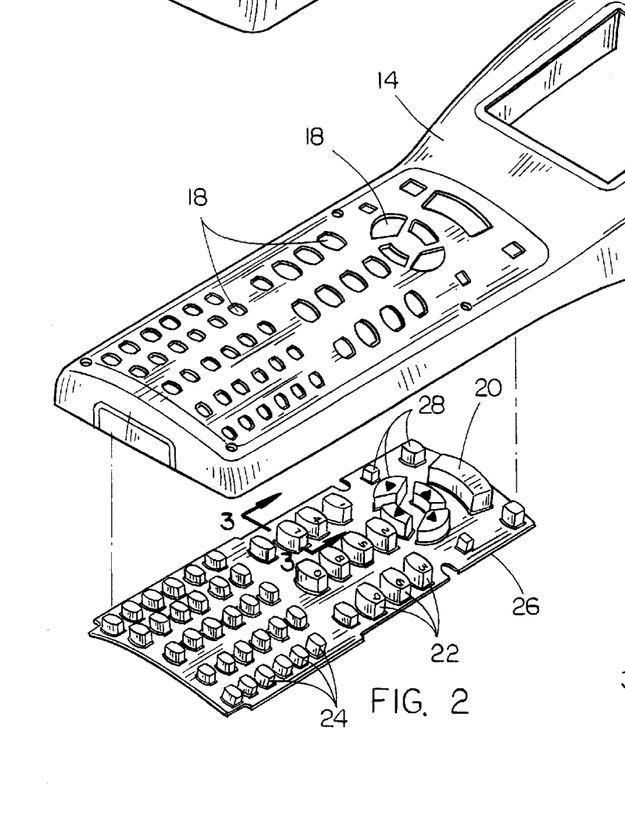
FIG. 2 is an exploded view of the data terminal shown in FIG. 1.

FIG. 2 is an exploded view of the data terminal shown in FIG. 1. The top shell 14 of the data terminal's housing, which may be fabricated from plastic, metal, or the like, may be molded to have a curvilinear cross-section. Apertures 16 may be cut, molded or otherwise fabricated into the top shell 14. Keys (20, 22, & 24) may be attached to a circuit board 22. This circuit board 26 may be rigid or flexible and may have a curvilinear cross-section similar to that of the top shell 14 such that the circuit board 26 may rest against the inside surface of the top shell 14 allowing keys (20, 22, 24 & 28) to extend through the apertures 16 in the top shell 14. Keys (20, 22, 24 & 28) may extend through the apertures 16 to various heights according to their function so that the user may, by sense of touch, determine which keys he is pressing. For example, a scan trigger key 20, which may be used to activate a optical character set reader (not shown) or the like may extend the farthest from the keypad. Numerical keys 22 may extend the next farthest, and alphabetic keys 24 may extend the least. Keys having other functions 28 may likewise extend to a different height if desired.

Figure 3:
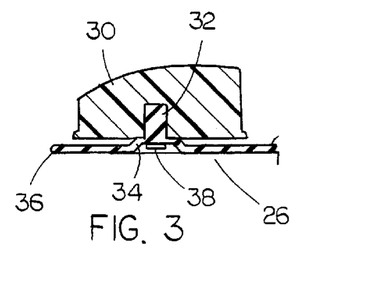
FIG. 3 is a cross-sectional side elevational view of a key assembly from the keypad of the embodiment disclosed in FIG. 1.

FIG. 3 is a cross-sectional side elevational view of a key from the keypad of data terminal disclosed in FIG. 1. The key 30 may be attached by tab 32 to a resilient boot 34. This resilient boot 34 may be molded into a flexible sheet 36 covering the circuit board 22. The tab 32 may be integrally molded into the boot 34. When the key 30 is depressed by the user, the boot 34 is collapsed allowing a contact 38 to be pressed against a second contact on the circuit board 26. An electrical circuit is thus completed between the two contacts indicating to the data terminal's processor (not shown) that the key 30 has been depressed. Preferably, when the user releases the key 30, the resilient boot 34 returns to its uncollapsed shape, forcing the key 30 to return to its non-depressed position.

Figure 4:
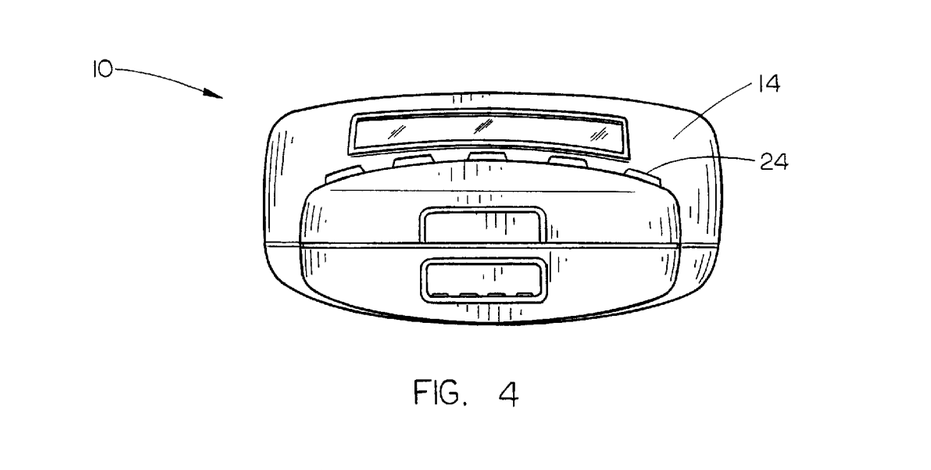
FIG. 4 is an elevational view of the bottom end of the data terminal disclosed in FIG. 1 illustrating the curvilinear cross-section of the keypad.
Figure 5:
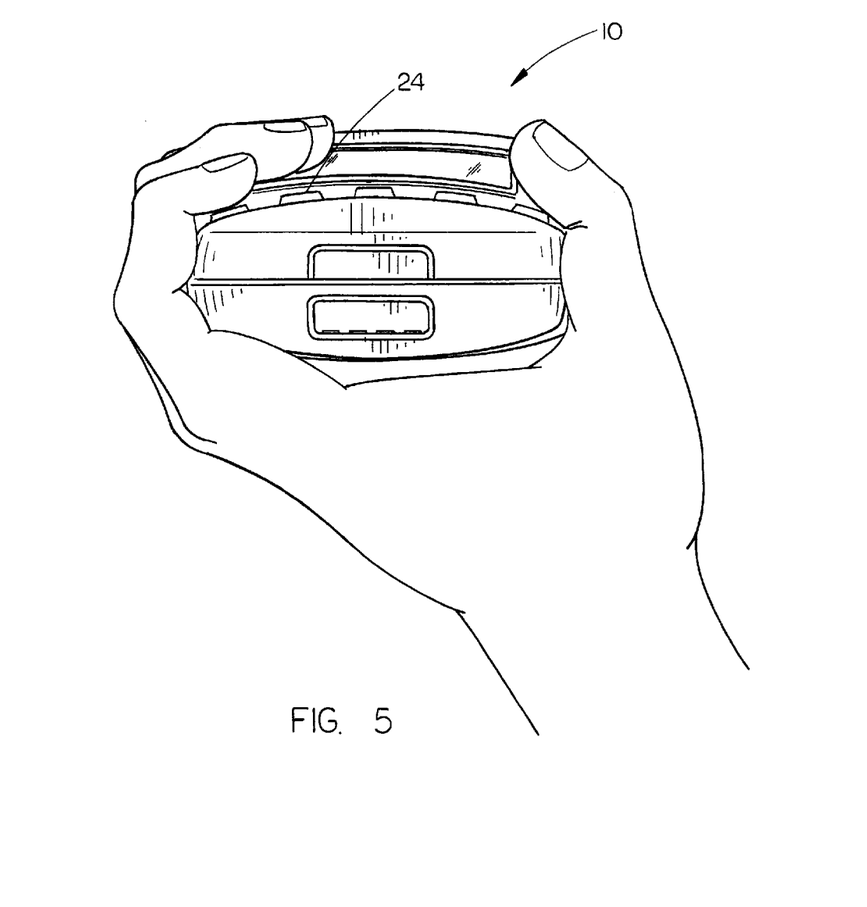
FIG. 5 is an elevational view of the bottom end of the data terminal illustrating how a user may grip the terminal during operation.

FIGS. 4 and 5 are elevational views of the bottom end of the data terminal disclosed in FIG. 1. FIG. 4 clearly illustrates the curvilinear cross-section of the keypad. FIG. 5 illustrates how a user may grip the data terminal during operation. The user may operate the data terminal with one hand if necessary, depressing keys on the keypad much like a guitarist works a fret keyboard.

Figure 6:
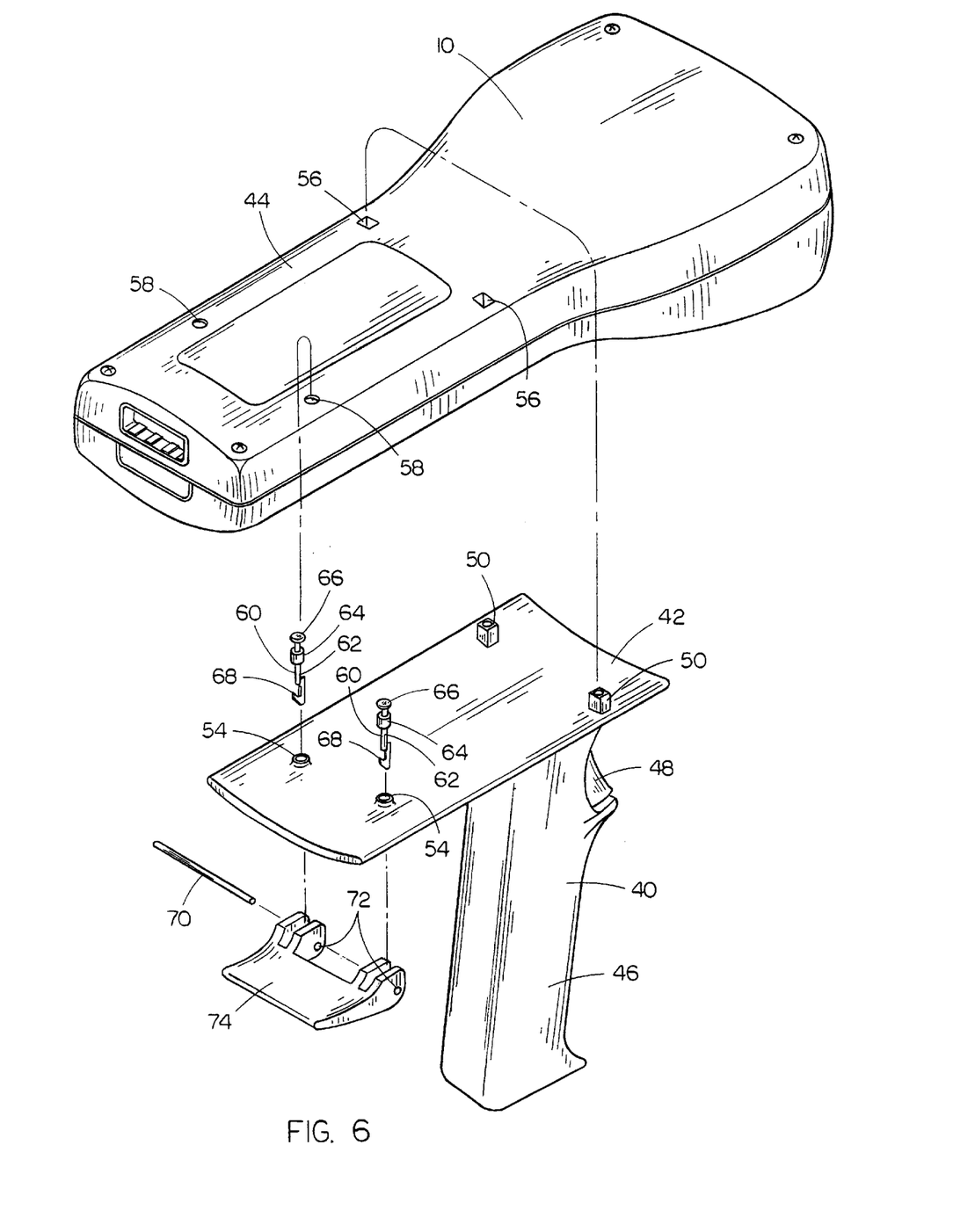
FIG. 6 is and exploded view depicting the attachment of a pistol grip assembly to the data terminal disclosed in FIG. 1.

FIG. 6 is an exploded view depicting the attachment of a pistol grip assembly to the data terminal disclosed in FIG. 1. The pistol grip assembly 40 may comprise a generally horizontal mounting plate 42 shaped to conform to the bottom shell 44 of the data terminal 10 and a grip 46 containing a trigger 48. Preferably, the grip 46 is ergonomically designed to fit the typical user's hand. Tabs 50 may be molded or otherwise attached to near the forward end of the top surface 52 of the mounting plate 42. Similarly, holes 54 may be disposed near the mounting plate's rear edge. Correspondingly, the bottom shell 44 of the data terminal 10 may have disposed in it rectangular notches 56 and round holes or cavities 58. Preferably, the tabs 50 attached to the mounting plate 42 may be removably insertable into the notches 58 when the pistol grip assembly 40 is mated with the data terminal 10 to properly position the grip. Removeably receivable guides 60, comprising cylindrical shafts 62 onto which O-rings 64 may be mounted, may extend through holes 54 in the mounting plate 42. These guides 60 may have a flattened head 66 to retain the O-rings 64. Preferably, the bottom ends of the guides 60 terminate in hooks 68. These hooks 68 may extend through the holes 54 in the mounting plate 42 to hook around a horizontal shaft 70 which passes through holes 72 in a lever-type latch 74. When the lever-type latch 74 is rotated to the latched position (flush to the bottom surface of the horizontal mounting plate 42), the guides 60 are pulled downward compressing the O-rings 64 against the interior edges of the holes 58 in the bottom shell 44 of the data terminal 10. Preferably, when compressed, the O-rings 64 will not pass through the holes 58. In this manner, the pistol grip assembly 40 may be securely attached to the bottom shell 44 of the data terminal 10. When the lever-type latch 74 is rotated to the unlatched position (perpendicular to the bottom surface of the horizontal mounting plate 42) the guides 60 are released upward allowing the O-rings 64 to expand and slide through the holes 58 in the bottom shell 44 of the data terminal 10, releasing the pistol grip assembly 40.

Figure 7:
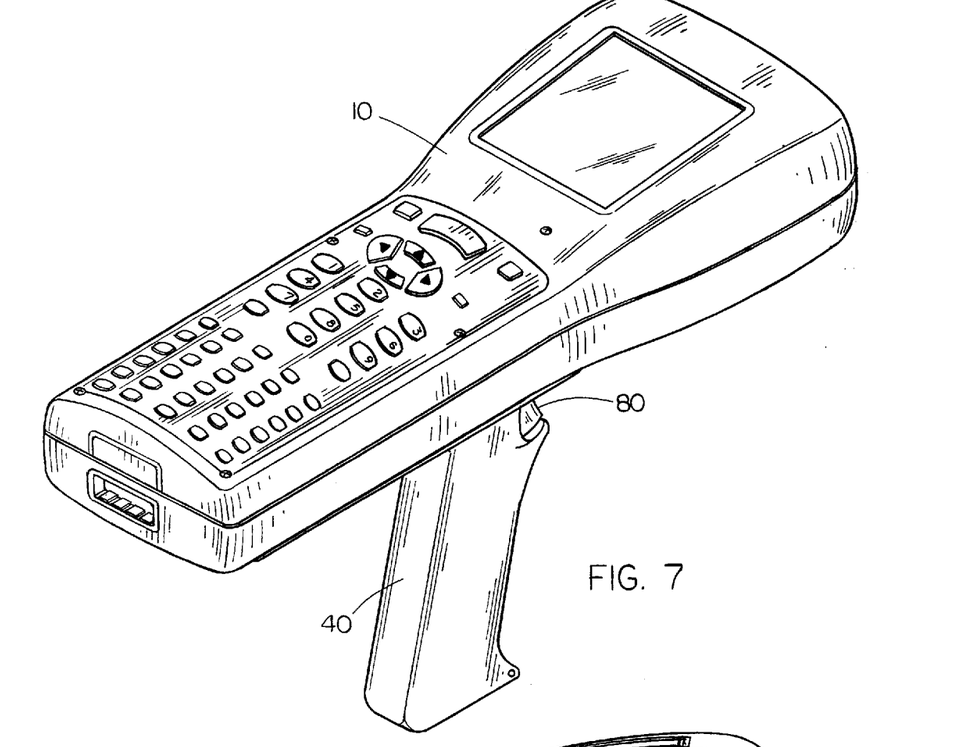
FIGS. 7 and 8 are pictorial and side elevational views respectively illustrating the pistol grip assembly secured to the data terminal.
Figure 8:
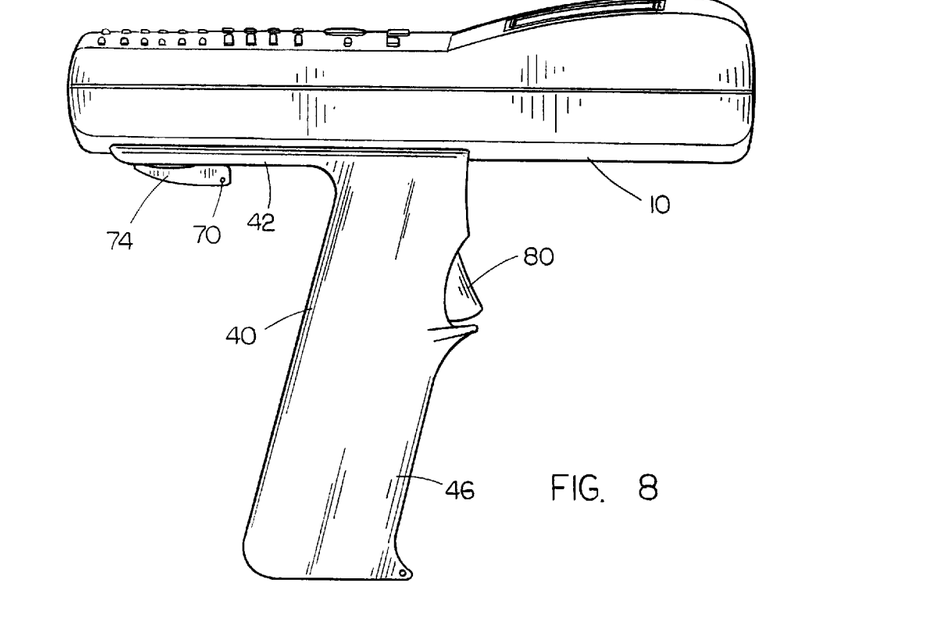

FIGS. 7 and 8 are pictorial and side elevational views respectively illustrating the pistol grip assembly secured to the data terminal. FIG. 8 depicts the lever-type latch 74 rotated to the latched position (flush to the bottom surface of the horizontal mounting plate 42).

Figure 9:
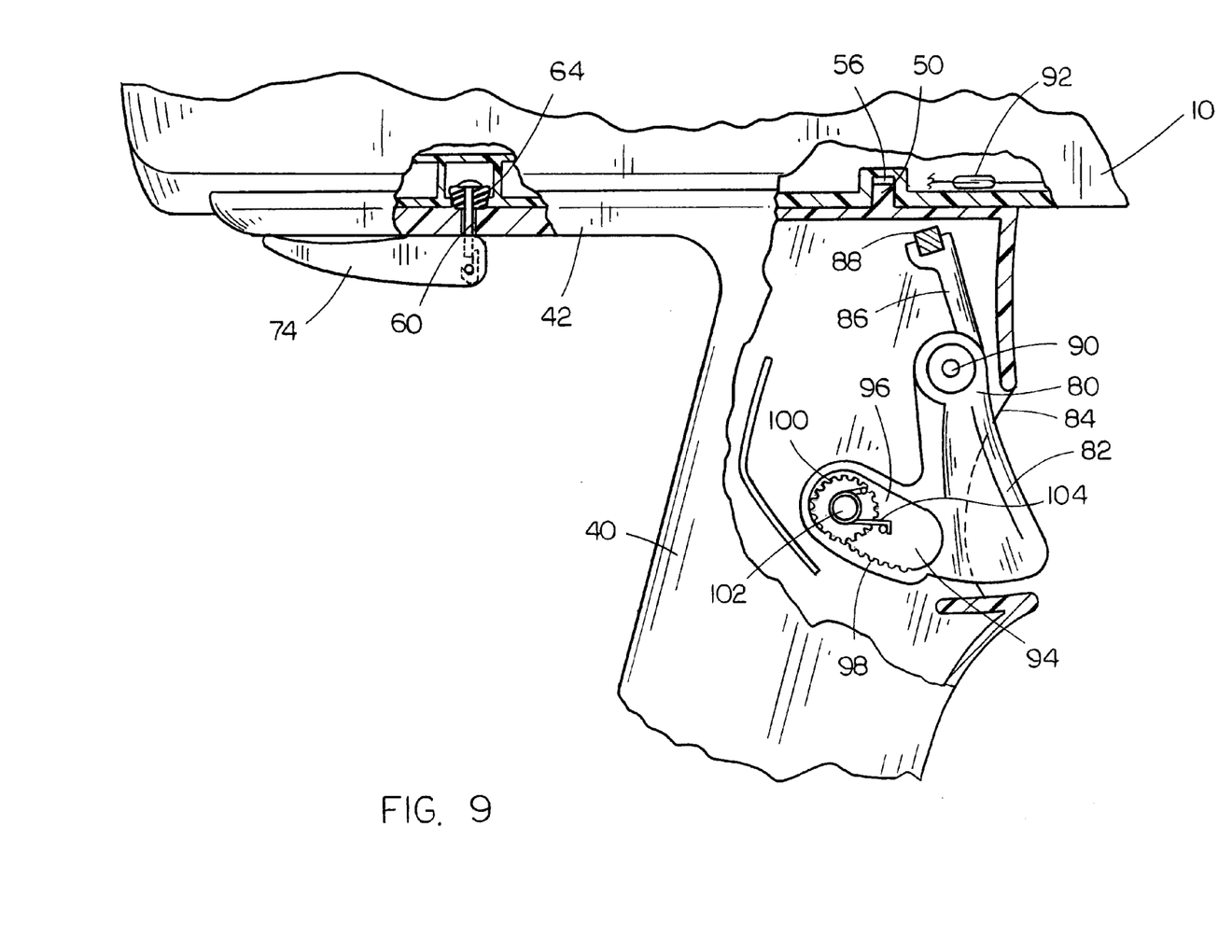
FIG. 9 is a partial cross-sectional side elevational view of the pistol grip assembly attached to the data terminal showing exemplary embodiments of the attachment mechanism and reed switch/magnetic trigger assembly.

FIG. 9 is a partial cross-sectional side elevational view of the pistol grip assembly attached to the data terminal showing exemplary embodiments of the attachment mechanism and reed switch/magnetic trigger assembly. The lever-type latch mechanism 74 is shown in the latched position (flush to the bottom surface of the horizontal mounting plate 42) pulling downward on the guide 60 and compressing the O-ring 64. Tabs 50 are shown inserted into notches 56 in the bottom shell 44 of the data terminal 10.

FIG. 9 also illustrates an exemplary embodiment of a reed switch/magnetic trigger mechanism. Preferably, the pistol grip assembly 40 comprises a trigger mechanism 80 having a trigger 82 which extends through an aperture 84 in the pistol grip assembly 40. The trigger 82 may have a shaft 86 integrally molded onto it. A small magnet 88 may further be attached to the end of the shaft 86 opposite the trigger 82 by an adhesive or the like. Preferably, the trigger mechanism 80 is pivotally mounted within the pistol grip assembly 40 at a point 90 such that when the user depresses the trigger 82, the shaft 86 is rotated in a vertical plane to bring the magnet 88 to rest beneath the reed switch 92. A return mechanism 94 may also be incorporated into the trigger mechanism 80. This return mechanism 94 may comprise a channel 96 having a splined surface 98 onto which a splined wheel 100 may roll. This splined wheel 100 is attached to the pistol grip assembly 40 by an axle 102. A spring 104 may be attached to the pistol grip assembly 40 and to the splined wheel 100. Preferably when the user depresses the trigger 82, the splined wheel 100 rolls in the splined channel 96 coiling the spring 104. When the trigger 82 is released, the spring 104 uncoils rotating the splined wheel 100 in the splined channel 96 and returning the trigger 82 to the undepressed position. FIG. 9 shows the trigger mechanism 80 in the undepressed position with the magnet 88 rotated away from the reed switch 92.

Figure 10:
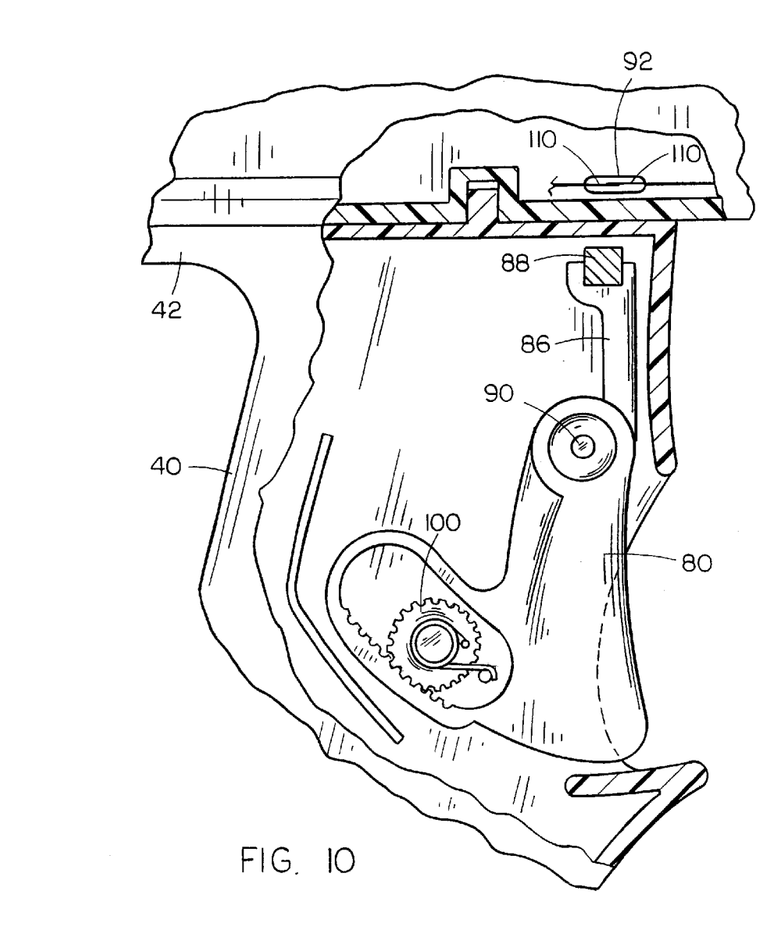
FIG. 10 is a partial cross-sectional side elevational view of the pistol grip assembly attached to the data terminal further illustrating the reed switch/magnetic trigger assembly.

FIG. 10 is a partial cross-sectional side elevational view of the pistol grip assembly attached to the data terminal further illustrating reed switch/magnetic trigger assembly. This view shows the trigger mechanism 80 in the depressed position causing the magnet 88 to be rotated beneath the reed switch 92. The magnet 88 causes the contacts 110 of the reed switch 92 to come together activating the data terminal's optical character set reader or the like.

Figure 11:
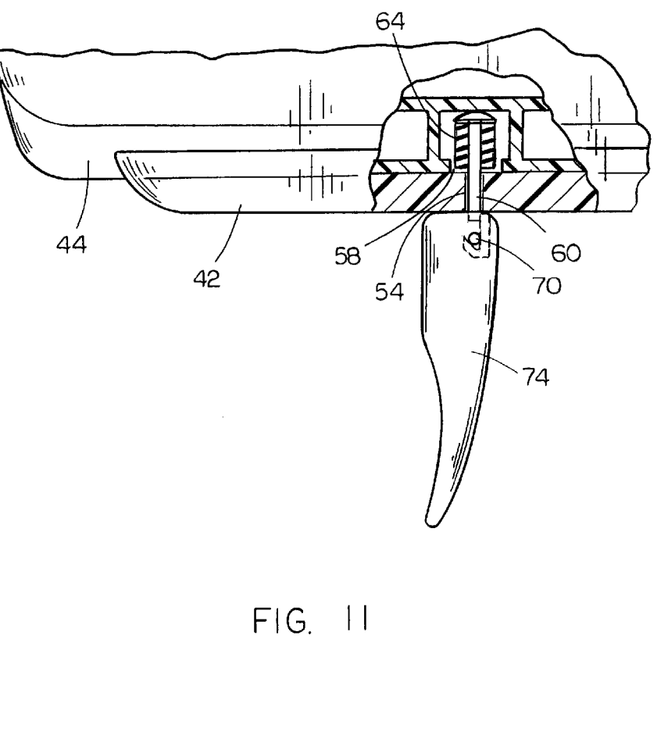
FIG. 11 is a partial cross-sectional side elevational view of the pistol grip assembly attached to the data terminal further illustrating the attachment mechanism.

FIG. 11 is a partial cross-sectional side elevational view of the pistol grip assembly attached to the data terminal further illustrating the attachment mechanism. The lever-type latch mechanism 74 is shown in the unlatched position (perpendicular to the bottom surface of the horizontal mounting plate 42) releasing the guide 60 upward and allowing the O-ring 64 to return to its uncompressed state. The O-ring 64 may then pass through the hole 58 in the bottom shell 44 of the data terminal's housing. Preferably, the holes 54 in the pistol grip assembly's mounting plate 42 are sized to have a smaller diameter than the O-ring 64 to provide retention of the O-ring/guide/lever assembly.

The hand-held portable data terminal of the present invention preferably utilizes an AMD Élan SC300 microcontroller for primary processing and control functions. The Élan 386SC300 microcontroller is a highly integrated, low power, single-chip system comprising an Am386SXLV microprocessor plus additional supporting logic required for providing AT-compatible personal computer compatibility. The SC300 includes a programmable interval timer (8254 compatible), programmable interrupt controllers (8259 compatible), direct memory access controllers (8237 compatible), universal asynchronous receiver and transmitter (NS16450 compatible), real time clock (MC146818A compatible) with 114 bytes of user RAM, PS/2 compatible bidirectional parallel port with EPP support, AT Port B and NMI enable, PS/2 compatible port 92 fast reset and A20 Control, 0.8 mm low voltage CMOS process, packaged in 208 Pin PQFP, internal phase-locked loops to generate all necessary clocks from a single 32.768 kHz crystal input, and a system operation voltage from 3.0 V to 5.5 V.

The microcontroller address bus is split into 2 sections. The address bits for the local bus memory are multiplexed with the RAS and CAS signals for the local bus DRAM chips. These signals come out on the pins called MA(0-MA11). For system accesses the bits SA0–SA12 are put out by the MICROCONTOLLER and the bits SA13–SA23 are put out on the pins MA(0–11) note that there is not a one-to-one correlation of the bit orders.

The MICROCONTROLLER data bus is a 16 bit data bus. The local data bus is a 3.3 volt bus while the system bus is a 5 volt bus. The MCU supports system management, mode memory mapping, full control of system and internal peripheral clocks, and includes clock switching during ISA cycles.

Multiple operating modes are provided: FULL ON Mode (Full speed); ON Mode (Programmed Low Speed); DOZE Mode; SLEEP Mode; SUSPEND Mode; and OFF Mode. The data terminal supports five programmable power management control outputs, supports a resume and suspend key, includes four battery low monitor inputs, and provides low power consumption and reduced suspend current draw. Current draw is 180 mA in FULL ON mode at 3.3 V operation; 40 mA in DOZE Mode at 3.3 V; 100 mA or less in SUSPEND Mode at 3.3 V including suspending the refresh of the DRAM array.

The MICROCONTROLLER boots up in FULL ON mode. In suspend mode the VCCCOL power plane goes to 0 volts dc. Zero wait-state is provided with access times of 70 ns, 3.3V, page mode DRAM's refreshed at 33 MHz. On board memory up to 16 MB is provided.

The DRAM and SRAM control interface supports up to two 16-bit banks of DRAM, supports 1M, 4M, and 16M DRAM types including support for 1M×16 asymmetrical type DRAM, and provides support for slow refresh and self refresh DRAM. The DRAM and SRAM control interface further supports twelve 16 KB EMS Pages or Windows including support for EMS 4.0 with 8 page registers for BIOS, PCMCIA, on board EMS, and DOS-ROM access. Further, the memory control interface supports up to 320 Kbytes for BIOS ROM or Flash, supports up to 16M Bytes of application or DOS ROM or Flash, provides shadow RAM support software FONT in CGA mode, and supports two PCMCIA Version 2.0 slots.

The RAS, CAS, and address lines are series dampened with 33.2 Ohm resistors. The MICROCONTROLLER has 4 voltage control oscillators that control the clock synthesizers. The voltage on the PL pins is preferably less than 2.0 volts. The PL pins are high impedance analog pins that go directly to the VCO's.

The MICROCONTROLLER provides a 33 MHz CPU which incorporates a low power, fully static design and system management mode (SMM) support with I/O trapping capability. The core of the MICROCONTROLLER operates at 3.3 volts and therefore utilizes a 3.3 V to 5 V level translator for supporting 5 V devices. The level translator is preferably PT74FCT164245 available in a quad flat pack. The level translator includes split 8 bit level translators with independent controls. The function of the level translators is to convert the core system levels from 3.3 volts to the 5 volt levels used by the peripheral devices. The core system runs at 3.3 volts for minimizing power consumption and generated heat. The direction of translation is determined on a cycle by cycle basis depending on the state of the read-write signal from the MICROCONTROLLER chip.

Three different DRAM loading 2, 4, and 8 Megabyte options are provided, 3.3 volt operation, 70 ns DRAM Access Time, fast page mode accesses (40 ns), Flash ROMCS and DOSCS having 5 wait states, and read write accesses. FLASH commands are set at 1 system clock extension (0 to 4 states are available). PCMCIA memory accesses are set at 4 wait states, 12 wait state for the commands (0.5 and 0 are available), ISA IO commands delay and 1 system clock delay (0.5 and 2 available). For ISA memory commands 1 system clock (0.5 is available). For ISA IO read and write 0×000 H to 0×100 H the delay is set to 4 wait state (2 available) for 0×100 to 0×3 FF the delay is set to 5 wait states (2, 3, 4 and 5 are available). For reads and writes to the BIOS 3 wait states are provided, and for refreshing wait states 3 are provided (2 is available also).

DRAM for page mode bank misses 5 wait states are provided (3 are available). For the page mode first cycle the wait state is 3 (1, 2 and 3 are available). For bank misses in page mode 5 wait states are provided (3 or 5 is available). The refresh rate is 8K per second (8, 10.5, 16 or 32K). Enhanced page mode is unavailable when both banks are 512K by 8.

Page mode options for the hand-held data terminal of the present invention include 1-page, 2-page, 4-enhanced, 8-page and 16-enhanced. C,D,E are the drive strengths for the CAS and RAS lines to the DRAM wherein the default value of E is preferably utilized. High speed ROM and DOS chip selects are available.

The 2 Megabyte loading of DRAM for the MICROCONTROLLER may be configured as 4-1 Meg by 4 bit DRAM chips or as 1-1 Meg by 16 bit DRAM chips. All the chips are loaded in Bank 0. The data terminal of the present invention preferably utilizes the 1 Meg by 16 bit configuration of DRAM because of the pricing and availability of the larger DRAM. One typical 1 Meg by 16 bit DRAM chip that functions well with the MICROCONTROLLER chip is the Hitachi HM51W18160ALTT-7.

The 8 megabyte loading of the MICROCONTROLLER chip must be loaded as 4—4 Meg by 4 bit DRAM chips. The chips are all in Bank 0. The CMOS Dynamic RAM is organized as 4,194,304 words by 4 bits. It is 70 ns DRAM and can do fast page accesses in 40 ns. In the active mode the DRAM will consume 360 mW maximum. In standby mode, self refresh, the DRAM will consume 0.36 mW maximum. The refresh period is 2048K refresh cycles per 128 ms. The DRAM supports 4 versions of refresh, RAS only, CAS before RAS, hidden refresh, and self-refresh. The self-refresh mode is preferably utilized.

| The pin out is as follows | | | |
|---|---|---|---|
| 1 | Vcc | 26 | Vss (Ground) |
| 2 | I/O1 | 25 | I/O4 |
| 3 | I/O2 | 24 | I/O3 |
| 4 | WE (Active Low) | 23 | CAS (Active Low) |
| 5 | RAS (Active Low) | 22 | OE (Active Low) |
| 6 | No Connect | 21 | A9 |
| 7 | No Pin | 20 | No Pin |
| 8 | A10 | 19 | A8 |
| 9 | A0 | 18 | A7 |
| 10 | A1 | 17 | A6 |
| 11 | A2 | 16 | A5 |
| 12 | A3 | 15 | A4 |
| 13 | Vcc | 14 | Vss (Ground) |

For all of the configurations of FLASH the boot code must be pre-programmed in the FLASH chips before installation. The FLASH interface is preferably 8 bits wide.

The hand-held data terminal of the present invention includes two locations on the PCB for 512K×8 5 volt FLASH in a 32 pin TSOP package and will also include two 56 pin TSOP location for the Intel 16 M bit SmartVoltage FLASH. Intel corporation shall soon provide 32 Mbit and 8 Mbit FLASH that will be pin and function compatible with this chip footprint.

The 1 Megabyte configuration of FLASH is implemented with two 512K×8 bit FLASH chips from AMD corporation. The chip is organized in 1024 blocks of 512 bytes each. There is a software protection algorithm that is employed to prevent accidental erasure of FALSH data.

The 2 Megabyte configuration of FLASH is implemented with a 16 Megabit SmartVoltage FLASH chip from Intel Coporation. This part is programmable in hardware to support a byte wide interface. This will make the configuration of the FLASH chip 2 Megabyte by 8. Features of the 28F016SV FLASH chip include 65 ns access time, 1 million erase cycles per block, 480K bytes per second sustainable write transfer rate, multiple command execution, a write during erase feature, a 2 mA typical deep power-down, and 32 independently lockable blocks.

The 28F016SV further includes thirty-two 64-KB blocks and the capability to operate at 3.3 or 5 volts for Vcc and the ability to program blocks at either 5 or 12 volts. The 28F016SV internally and automatically detects the Vcc operating voltage and configures the device for optimum performance at the detected voltage. A superset of the commands from the 28F008SA command set has been added to achieve higher write performance and provide additional capabilities. The new commands are: page buffer writes to flash, command queuing, automatic data writes during erase, software locking of memory blocks, two-byte successive writes in 8-bit systems, and an erase of all unlocked blocks command.

Each block can be written a minimum of 100,000 times. Systems can achieve 1 million cycles by employing block wear-leveling algorithms and graceful block retirement. The 28F016SV incorporates two page buffers of 256 bytes each to allow page data writes. This feature can improve performance by up to 4.8 times over flash that doesn't employ page buffers.

All operations are started by a sequence of write commands to the device. Three status registers and a RY/BY# output pin provide information on the progress of the requested operation. The 28F016SV allows queuing of the next operation while the memory executes the current operation. This eliminates system overhead when writing several bytes in a row to the array or erasing several blocks at the same time. The 28F016SV can perform write operations to one block of memory while performing erase of another block.

The 28F016SV provides selectable block locking to protect ROM-Executable O/S. Each block has an associated nonvolatile lock-bit which determines the lock status of the block. In addition, the 28F016SV has a master write protect pin which prevents any modification to memory blocks whose lock-bits are set. The 28F016SV employs an open drain RY/BY# output pin. This feature allows multiple RY/BY# pins to be wire-Ored together. The device proliferation code for the 28F016SV is 01 Hex. The 28F016SV employs dual chip enable pins, both CE0 and CE1 must be low for the chip to be enabled.

A high to low transition on the RP# pin will initialize the deep power-down mode of the 28F016SV. In this mode the power consumption is typically less that 5 mA. The 28F016SV requires 300 ns after being in the deep power-down mode for the output to become valid. After coming out of the deep power-down mode the write status mode (WSM), compatible status register (CSR), global status register (GSR) and the block status register (BSR) registers are all cleared. The standby mode current consumption of the 28F106SV is 350 mA max. The word write time is typically 25 ms and the block write time is typically 1.4 seconds. The RY/BY# pin needs a pull up resistor on it. The address pins have 8 pF of capacitance. The data pins have 12 pF of capacitance on them. Read current is 135 mA maximum while write current is 40 mA maximum.

The 4 Megabyte configuration of FLASH is implemented with a 32 Megabit SmartVoltage FLASH chip available from Intel Corporation. This part from Intel is actually a dual 16 Mbit die in one package. The FLASH is programmable in hardware to support a byte wide interface. This will make the configuration of the FLASH chip 4 Meg by 8.

The radio interface of the hand-held data terminal of the present invention will support three radio modules. The interface to the radios is 8 bits wide. The interface to the radios supports A(0–12) for I/O register access. The transfer speed to the radio interface is through the 8 MHz ISA bus.

The radio of the present invention is preferably a FALCON 900 MHz Spread Spectrum Radio from NORAND Corporation of Cedar Rapids, Iowa. A PCMCIA formatted version of the FALCON radio is preferably utilized. The synthesized UHF radio is preferably a 400 MHz radio also designed by and available from NORAND Corporation. A PCMCIA form factor version of this radio is preferably utilized as well. The 2.4 GHz radio for the data terminal of the present invention is the Proxim 2.4 GHz radio. A PCMCIA form factor version of this radio is preferably utilized.

The display of the data terminal of the present invention is preferably a film compensated super twist technology (FSTN) display. Several display sizes may be provided. The refresh rate for the display is 1/100. The display interface allows for reading a voltage level to determine the resolution of the display attached. The following table shows the display resolutions versus voltage ratio. The ratio is the following relationship Vout/Vin, where Vin is voltage supplied on pin 7 of the display and Vout is read on pin 24 of display (LCD_TYPE).

| Display # | X resolution | Y resolution | Vendor | Ratio |
|---|---|---|---|---|
| 346-036-001 | 160 | 144 | Optrix | 1 |
|  |  |  |  | 0.75 |
| 346-036-001 | 160 | 128 | 3-5 | 0.50 |
| 346-037-001 | 128 | 64 | 3-5 | 0.25 |
|  |  |  |  | 0 |

The contrast voltage for the hand-held data terminal of the present invention is generated by the MAX749 chip available from Maxim Integrated Products. The contrast voltage is adjusted under the control of the PIC16C74 microcontroller used for keyboard scanning. The contrast voltage for the display needs to be adjustable from −18 to −24 volts dc at 12 mA. The circuit works by turning on the FET that connects the 5 volt power supply to ground through a 50 mH inductor. The control chip then switches off the FET and the inductor pulls current up through the diode connected to the panel thus generating a negative voltage on the input to the panels contrast voltage. A 15 mF 35 volt capacitor is connected to the contrast line to help filter out the ripples caused by the switching action of the FET. The voltage on the contrast pin is regulated by the MAX749 chips FB pin. This pin provides an internal dc voltage reference. As the voltage on the display increases the FB voltage goes down and the switcher starts to back off. To adjust the contrast voltage the FB pins voltage is adjusted by the PWM signal from the coprocessor.

| PIN | NAME | FUNCTION |
|---|---|---|
| 1 | V+ | +2v TO +6v. Input Voltage to power the MAX749 and external circuitry. When using an external P-channel MOSFET, V+ must exceed the MOSFET's gate threshold voltage. |
| 2 | ADJ | Logic Input. When CTRL is high, a rising edge on the ADJ increments an internal counter. When CTRL is low, the counter is reset to mid-scale when ADJ is high. When ADJ is low, the counter does not change (regardless of activity on CTRL) as long as V+ is applied. |
| 3 | CTRL | Logic Input. When CTRL and ADJ are low, the MAX749 is shut down, but the counter is not reset. When CTRL is low, the counter is reset to mid-scale when ADJ is high. The device is always on when CTRL is high. |
| 4 | FB | Feedback Input for output full-scale voltage selection. - $V_{OUT}(MAX) = (R_{FB})*(20uA)$ where $R_{FB}$ is connected from FB to - $V_{OUT}$. The device is in regulation when $V_{FB}=0V$. |
| 5 | GND | Ground |
| 6 | DLOW | Output Driver Low. Connect to DHI when using an external P-channel MOSFET. When using an external PNP transistor, connect a resistor $R_{BASE}$ from DLOW to the base of the PNP to set the maximum base-drive current. |
| 7 | DHI | Output Driver High. Connect to the gate of the external P-channel MOSFET, or to the base of the external PNP transistor. |
| 8 | CS | Current-Sense Input. The external transistor is turned off when current through the sense resistor, $R_{SENSE}$, brings CS below V+ by 140mV(typical). |

The MAX749 is a negative-output inverting power controller that can drive an external PNP transistor or P-channel MOSFET. An external resistor and an internal DAC control the output voltage. The MAX749 is designed to operate from 2 V to 6 V inputs, ideal for operation from low-voltage batteries. In systems with higher-voltage batteries, such as notebook computers, the MAX749 may also be operated from the regulated +5V supply. A high-efficiency +5V regulator, such as the MAX782, is an ideal source for the MAX749. In this example, the MAX749 efficiency (80%) is compounded with the MAX782 efficiency (95%): 80%× 95%=76%, which is sufficiently high. The MAX749 and the external components in the typical operating circuit form a flyback converter. When the external transistor is on, current flows through the current-sense resistor, the transistor, and the coil. Energy is stored in the core of the coil during this phase, and the diode does not conduct. When the transistor turns off, current flows from the output through the diode and the coil, driving the output negative. Feedback control adjusts the external transistor's timing to provide a regulated negative output voltage.

The MAX749's unique control scheme combines the ultra-low supply current of the pulse-skipping, pulse-frequency modulation (PFM) converters with the high full-load efficiency characteristic of pulse-width modulation (PWM) converters. This control scheme allows the device to achieve high efficiency over a wide range of loads. The current-sense function and high operating frequency allow the use of tiny external components.

Switching control is accomplished through the combination of a current limit in the switch plus on- and off-time limits. Once turned on the transistor stays on until either the maximum on-time one-shot turns it off (8 ms later), or the switch current reaches its limit (as determined by the current-sense resistor and the current comparator). Once turned off, a one-shot holds the switch off for a minimum of 1 ms, and the switch either stays off (if the output is in regulation), or turns on again (if the output is out of regulation).

With light loads, the transistor switches for one or more cycles and then turns off, much like a traditional PFM converter. With heavy loads, the transistor stays on until the switch current reaches the current limit; it then shuts off for 1 ms, and immediately turns on again until the next time the switch current reaches its limit. This cycle repeats until the output is in regulation.

The output voltage is set using a single external resistor and the internal current-output DAC. The full-scale output voltage is set by selecting the feed-back resistor, $R_{FB}$. The output voltage is controlled from 33% to 100% of the full-scale output by an internal 64-step DAC/counter.

On power-up or after a reset, the counter sets the DAC output to mid-range. Each rising edge of ADJ increments the DAC output. When incremented beyond full scale, the counter rolls over and sets the DAC to the minimum value. In this way, a single pulse applied to ADJ increases the DAC set-point by one step, and 63 pulses decreases the set-point by one step.

Table 1 is the logic table for the CTRL and the ADJ inputs, which control the internal DAC and the counter. As long as the timing specifications for ADJ and CTRL are observed, any sequence of operations can be implemented.

TABLE 1

Input Truth Table

| ADJ | CTRL | RESULT |
|-----|------|--------|
| Low | Low | Shut down |
| High | Low | Reset counter to mid-range. The device is not shut down |
| X | High | On |
|   | High | Increment the counter |

Shutdown Mode:

When CTRL and ADJ are both low, the MAX749 is shut down (Table 1). The internal reference and biasing circuitry turn off, the output voltage drops to zero, and the supply current drops to 15 mA. The MAX749 retains its DAC setting, simplifying software control. If ADJ is high when CTRL is low, the DAC set point is reset to mid-scale and the MAX749 is not shut down. Mid-scale is 32 steps from the minimum, 31 steps from the maximum.

The PWM signal from the PIC16C74 micro-controller must be in the range of 5 kHz. The frequency of the PWM isn't the critical element of this circuit, the duty cycle is. When the PWM duty cycle is 0% the contrast voltage will be 0 volts. When the duty cycle is 100% the contrast voltage will be 20 V.

The EL backlight for the Hand-held data terminal of the present invention is an electroluminescent (EL) panel measuring approximately 2.2 by 2 inches. The capacitance of the EL panel is about 18 nF. The voltage waveform that drives the EL panel is generated by the HV801 High Voltage EL Lamp Driver chip from Supertex. The Supertex HV801 is a high voltage driver designed for driving panels up to 21 nF. The input supply range is from 4.5 to 10 volts. The HV801 uses one external inductor—Lx (330 mH), one external capacitor—Cs (10 mF @100 V) and two external resistors—Rslew (390 kW) and Rel-ocs (10 MW). The maximum output voltage that the HV801 will generate is +/−110 V. The output current waveform is programmed by the Rslew resistor. As the value of Rslew decreases the slew rate of Va and Vb increases. The HV801 is output short circuit protected.

The HV801 has two internal oscillators, a switching MOSFET, and a high-voltage EL lamp driver. The frequency for the switching MOSFET is fixed internally. The EL lamp driver frequency is set by the Rel-osc resistor. An external inductor is connected between the Vdd and Lx pin of the HV801. An external capacitor Cs is connected between Cs and ground. The EL panel is connected between Va and Vb.

The switching MOSFET charges the external inductor Lx and discharges it into the storage capacitor Cs. The voltage on Cs will start to increase. Once the voltage on Cs reaches a nominal value of 90 V, the switching MOSFET is turned off to conserve power. The outputs Va and Vb are configured as an H bridge and are switched in opposite states to achieve 180 V peak to peak across the EL panel. The backlight intensity is typically not adjustable. The resistor Rel-ocs must be placed very close to the HV801 for the circuit to work properly. Also the circuit must have a decoupling capacitor placed close to the inductor to localize the current surges caused by the inductor.

There is one serial channel reserved for the internal scanners use. The controller for this is the StarTech 16C550 serial controller. The Hand-held data terminal of the present invention supports three different loadings of internal scanners: the Symbol Technologies short range scanner; the Symbol Long Range Scanner and the Opticon CCD Scanner.

The Serial Controller for the internal scanner is the Startech ST16C550. The '550 is a universal asynchronous receiver and transmitter with 32 byte receive and transmit FIFO's. The serial rates can be programmed from 50 Hz to 448 kHz. The '550 supports software/hardware flow control and complete MODEM control capability. It also supports a processor interrupt system that may be software tailored to the users requirements. Finally, it supports internal loopback capability for on-board diagnostics. Other features include: sleep mode (800 mA); low operating current (1.5 mA typical); independent transmit and receive control; selectable transmit and receive trigger levels; infrared receive and transmit input/output. The Symbol SE1122 scanner contains a miniature scan engine and decoder, an onboard voltage monitor, a watchdog timer, a low current beeper and decode LED output lines, two serial I/O lines, two hardware handshaking lines, and an EEPROM for storing decoder capability parameters.

Power to the SE1122 is enabled when the PWREN line is driven high. After finishing power up initialization, the micro-controller waits for the TRIG line to go active or for data coming in on the RXD line. Pulling the trig line low will start a scan and decode session. If a valid bar code is scanned, the micro-controller will decode it and send the results to the host via the TXD line. The OEM hose may pull PWREN line low any time to disable the power to the SE 1022 if the PWRDWN pin is driven high by the SE 1022. The SE 1022 has a low power mode that maintains the internal RAM contents but freezes its system oscillator, causing the unit to be in a dormant state. All SE interface signals are TTL compatible.

The heart of the laser scan engine is a 48-pin custom ASIC which controls the majority of functions associated with a laser-based scanner. When the SCAN ENABLE and LASER ENABLE lines are brought low, the control circuitry sends a signal to the laser and motor driver circuits. The laser driver circuit turns the laser on and off, and regulates power to the laser. It also provides over-temperature protection that turns the laser off if the temperature rises above acceptable limits. The motor driver circuit controls the mylar "motor" (resonant scan element). It also incorporates a motor fail detection circuit that turns the laser off should the motor fail.

Attached to the mylar motor is a mirror which oscillates at 18 Hz nominally. The laser diode produces a single beam of coherent light which deflects off the mirror, and is emitted from the scan engine. The total deflection of this beam is 46 (degrees), and the scan frequency is 36 scans per second. When the light strikes a bar code, the dark bars absorb the light, and the light spaces reflect it. The reflected laser light is sensed by the photo diode which generates a current proportional to the reflected light signal. That current, in turn, produces a analog voltage which is amplified, filtered, and sent to a digitizer. Here the signal is transformed into a digital representation of the bar code called the Data Bar Pattern (DBP). The DBP is then sent to the host or decode board for processing into a host-compatible format.

The heart of the decoder is a microcontroller that provides the necessary intelligence for bar code decoding, host I/O interface protocol, and general decoder maintenance. Contained in the micro-controller is a watchdog timer. The enabling/disabling and maintenance of this watchdog are totally internal to the decoder; the host has no way of configuring the watchdog. In the event that the decoder locks up and has also disabled the watchdog, the host can unlock and restart the decoder by pulsing the PWREN line low for a minimum of 10 ms.

The decoder's reset circuitry holds the micro-controller in reset after power up to allow time for hardware initialization. This reset period is 20 ms+/−5 ms. The EEPROM stores the decoder capability parameters. After every reset, the decoder will check for faults in the EEPROM; if no faults are found, the EEPROM's content is copied into its internal RAM. If a fault is found, the decoder will ask for a new set of parameters from the host and copy default values into the RAM. The decoder will not correct the fault unless requested by the host.

The voltage monitor is always active and cannot be disabled. Its function is to monitor the supply voltage level from the host and force the micro-controller into reset when VBATT is under the minimum specified supply voltage level. The power switch controls the passage of VBATT to the SE 1022. Power is available when PWREN is driven high, and cut off when PWREN is driven low. The wake up circuitry is used for starting up the SE 1022 from the low power mode. To wake it up, the WKUP* signal must be held low for at least 6ms, otherwise the decoder may not wake up properly.

TABLE 1

Pin Description

| MNEMONIC | NO | TYPE | NAME AND FUNCTION |
| --- | --- | --- | --- |
| PWREN | 1 | I | Power Enable: This pin is used to switch-on and switch-off the power to the SE 1022. Power is on when PWREN is high. |
| VBATT | 2 | | Power Supply: This is the power supply voltage for the SE 1022 |
| GND | 3 | | Ground: 0 volt reference |
| RXD | 4 | I | Received Data: Serial input port |

TABLE 1-continued

Pin Description

| MNEMONIC | NO | TYPE | NAME AND FUNCTION |
| --- | --- | --- | --- |
| TXD | 5 | O | Transmitted Data: Serial output port |
| CTS* | 6 | I | Clear to Send: Serial port handshaking line |
| RTS* | 7 | O | Request to Send: Serial port handshaking line |
| PWRDWN | 8 | O | Power Down Ready: When high, the decoder is ready for the host to drive the PWREN line low. The SE 1022 is in reset or low power state whenever this pin is high. The micro-controller of the SE 1022 is in full operation whenever this pin is low. |
| BPR | 9 | O | Beeper: Low current beeper output pin, sink 500uA source 50uA |
| DLED* | 10 | O | Decode LED: Low current decode LED output, sink 500uA, source 50uA |
| WKUP* | 11 | I | Wake UP: When the SE 1022 is in the low power mode, driving this pin low for a minimum of 6ms will wake up the SE 1022. This line is level sensitive. It must be driven high before the SE 1022 receives the power down command; otherwise it may not power down correctly. |
| TRIG* | 12 | I | Trigger This pin is the hardware triggering line. Driving this pin low will cause the SE 1022 to start a scan and decode session. This pin can be programmed to be level or edge sensitive. The default is level sensitive. See Decoder Asynchronous Serial Interface Protocol Reference, Appendix B, Byte 4-- General Parameter Byte. |

Note: signal names with the "*" modifier are asserted when at the ground level (active low). Signal names without the "*" modifier are asserted when at the positive supply voltage level (active high).

The SE 1022 has three power modes comprising: cold standby; continuous power; and low power standby. The SE 1022 is in the cold standby mode when the PWREN line is driven low. All of the SE 1022's functions are inoperative, and all of the input lines become high impedance while the output lines float. The output lines may be pulled-up to the supply voltage level; however, the pull-up resistor value must not be lower than 10 kW.

When the PWREN line is driven high, the SE 1022 is in the continuous power mode. Depending on the state of the power mode parameter, the SE 1022 will perform in the following manner. If set to low power mode, the SE 1022's decoder will power itself and the scanner down after one second of waiting for a trigger pull or a serial I/O event. If a trigger pull or serial I/O event occurs, the SE 1022 will attempt a decode or try to communicate with the host. After this the decoder will again wait one second for a trigger pull or a serial I/O event before powering down. The host can sense that the SE 1022 has entered the low power mode when the PWRDWN line goes high. While in this mode, the decoder's internal RAM contents are intact. The output lines will be at the state just before powering down. All input lines, except for WKUP* and PWREN, are ignored by the decoder. The voltage monitor will continue to monitor the VBATT level. The host can wake up the SE 1022 by driving the WKUP* line low for at least 6 ms. It can also wake up the SE 1022 by pulsing the PWERN line low for at least 10 ms; this, however, will erase all of the decoder's internal RAM contents.

If the power mode parameter is set to continuous power mode, the SE 1022 will wait indefinitely for a trigger or serial I/O event. If the host wishes to remove power, it must first send a power down command via the serial I/O channel. The SE 1022 then acknowledges the request by driving PWRDWN pin high and goes into the low power mode. At this point, the host can remove the supply power by driving the PWREN line low, or it can put the SE 1022 into continuous power mode again by driving the WKUP* line low for at least 6 ms, or pulsing the PWREN line low for 10 ms. The host should check the state of the PWRDWN pin to determine if the SE 1022 is ready to be switched-off. This does not mean that the host is obligated to check. It is recommended that the OEM system does not use the PWRDWN signal to gate off the PWREN signal. This way, the host can always reset the SE 1022 by pulsing the PWREN line low for 10 ms. Random power removal may alter the contents of the SE 1022 local EEPROM.

The decoder asynchronous serial interface protocol (DASI) is a half-duplex asynchronous serial interface with two hardware handshaking lines. The four DASI specific interface signals are: TXD (Transmitted Data); RXD (Received Data); (RTS*) Request to Send; and CTS* (Clear to Send). The term "decoder" is used to refer to the SE 1022. Signal names with the "*" modifier are asserted when at the positive logic 0 state (active low). Signal names without the "*" modifier are asserted when at the positive logic 1 state (active high).

The TXD signal is for transmitting asynchronous serial data from the decoder to the OEM host. The RXD line is used by the decoder to receive asynchronous serial data from the OEM host. The DASI protocol does not support full-duplex data transfers; data is either being transmitted or being received by the decoder, but never both simultaneously. The RTS* signal is used by the decoder to ask the OEM host for permission to use the TXD line; the OEM host responds to the decoder's request via the CTS* signal. The CTS* signal can also be used by the OEM host to cancel the current data transfer sequence or lock out the decoder from requesting to transmit. The OEM host can transmit data to the decoder at any time if the RTS* line is not asserted by the decoder.

Beeper and Decode LED

The beeper and decode LED output lines do not provide enough current drive for use with the actual beeper and LED device. Additional buffering is needed.

The SE 1022's beeper output is optimized for use with beepers that have its resonant frequency at 2.5 kHz. The beeper output is a 50% duty cycle square wave.

If a non-inverting driver is used to buffer the DLED* line, the output of the driver should be connected to the cathode (–) end of the LED.

Infrared interface
115K Baud
IRDA Compliant

The Serial Controller for the IR interface is the Startech ST16C650. The '650 is a universal asynchronies receiver and transmitter with 32 byte receive and transmit FIFO's. The serial rates can be programmed from 50 Hz to 448 kHz. The '650 supports software/hardware flow control and complete MODEM control capability. It also supports a processor interrupt system that may be software tailored to the users requirements. Finally, it supports internal loopback capability for on-board diagnostics. Other features include:
Sleep Mode (800 uA)
Low Operating Current (1.5 mA typical)
Independent transmit and receive control.
Selectable transmit and receive trigger levels.
Infrared receive and transmit input/output.

The IRDA function of the '650 is enabled/disabled in software. MCR bit-6 will be used to select regular TX/RX out/in puts or IRDA TX/RX out/in puts. After reset, MCR bit-6 will not function without enabling extended function register 4.

The IR transmitting circuit is controlled by the '650. The TX signal from the '650 drives an external FET which connects the cathode of a series of 2 IR LED's to ground. The LED's are driven in accordance with IRDA specs which call out a ⅜ pulse duration for an ON pulse.

The output power of the IR emitter is 65 mW nominal (50 mW min.) of IR light at 875 nanometers. The forward voltage drop of the IR LED is 1.5V (1.8V min.) at 100 mA.

Infrared receiving circuit

The receive function for the hand-held data terminal of the present invention is performed by a photo diode and a chip from SIRCOM. The photo diode is a photo PIN diode with an integrated filter matched for GaAs IR LED's. The SIRCOM chip performs the waveform recovery function for the IR interface.

The photo diode has a receiver area 5.7, a 70 nS on time, and a Load resistance of 1000 ohms.

Power management

There are three internally regulated power planes in the Hand-held data terminal of the present invention terminal. There are the 3.3 and 5 volt power planes that are never turned off and the 5 volt collapsible power plane that goes on and off with the suspend state of the MICROCONTROLLER processor. The MICROCONTROLLER runs from both the 3.3 and the 5 volt power planes. The 3.3 volt power is used for the internal core of the MICROCONTROLLER and the 5 volt power is used for the interface to the 5 volt circuits. The 3.3 volt power plane is also used to power the internal DRAM. The 5 volt power plane is used for the keyboard controller, the FLASH, the serial controllers, the display, the IRDA circuit and the display SRAM.

Discharge
BATT>8.4 All systems on.
BATT<6.0V–MICROCONTROLLER APM software puts
   MICROCONTROLLER into suspend.
AUXPWR<5.57V The comparator in the 3.3V regulator
   generates PFAIL which goes to BL4 of the MICROCONTROLLER. The SMI code in the MICROCONTROLLER put it into suspend.
AUXPWR<5.4 The BUB will begin discharging.
BATT+<4.8 The PACK will shut off.

The 3.3 volt power plane is under the control of a LT1174 micropower regulator from Linear Technology.

The 5 volt power plane is under the control of the LT1147 micropower regulator from Linear Technology. The main features of this part are:

1. Efficiency at 500 mA is over 95%
  2. Current mode operation for excellent line and load transient response
  3. Efficiency is over 83% from 1 mA to 2 Amps
  4. Standby current is 160 uA at light loads
  5. Wide input voltage range 5.4 to 16 volts
  6. Short-circuit protection The LTC1147 device drives an external P-channel power MOSFET at switching frequencies exceeding 400 kHz using a constant off-time current mode architecture providing constant ripple current in the inductor. Pin 1 (Vin) of the LTC1147 is the main power pin. There must be a decoupling capacitor close to this pin. Pin 2 (Ct) is connected to an external capacitor which set the operating voltage in conjunction with Vin and Vout. Pin 3 (Ith) is the gain amplifier decoupling point. The current comparator threshold increases with the voltage on pin 3. Pin 4 (Sense−) connects to the internal resistor divider which sets the output voltage. Pin 4 is also the minus input for the current comparator. Pin 5 (Sense+) is the (+) input for the current comparator. A built-in offset between pin 4 and 5 in conjunction with Rsense sets the current trip threshold. Pin 6 (Shutdown) when grounded the LTC1147 operated normally, when the voltage on shutdown is over 2 volts the LTC1147 will enter the micropower shutdown mode. Pin 7 (Ground) Two independent ground lines must be run from the ground pin. One must go to the (−) terminal of Cout and the other must go to the (−) terminal of Cin and the cathode of the Schottky diode. Pin 8 (P-Channel drive) this is the high current drive for the P-channel MOSFET. Voltage swing on this pin is from Vcc to ground. The 5 volt collapsible power plane is split.

The backup battery will be 6 Nickel Metal Hydride button Cells from Plainview Batteries Inc. They should have no memory effects like NiCad batteries and no disposal issues like the chemistries that use heavy metals. The cells when connected in series should never be discharged below 6 volts total. The highest voltage on the cells will be about 8.5 volts when fully charged and with no load. The rated capacity is about 120 mA min. The capacity will be at 50% after 500 cycles. The charging method for the cells will be a constant current supply with shutoff. The on time and off time are under the control of the PIC16C74 keyboard micro controller.

The constant current supply for the backup battery is a discrete component circuit that will function something like a voltage doubler. The output current for the circuit is determined by the switching capacitor size C1, by the switching frequency, by the input voltage, and by the output voltage. The ratio is Iout=V1−V2/(1/(f *C1)). The actual values are as follows:

The keyboard microcontroller implements a simple gas gauge since we have to charge the pack quickly but cant leave it on fast charge when the unit it too hot or too cold. Here it the flow that the keyboard controller follows:

One time each second the keyboard controller executes this loop.

```
if(power_up reset)              //Was the unit completely dead?
    {set gas_count to 00H}      //We need a full charge.
if(OldBuBattVoltage >= BuBattVoltage) //Has BUB Voltage gone up?
    if((OldBuBattVoltage-BuBattVoltage)>=3)// more than 60mVDC?
        StatusToDo = 1;         //Notify Main Application.
    else                        //Voltage is the same or less.
    if((BuBattVoltage-OldBuBattVoltage)>=3)// down more than 60mV?
        StatusToDo = 1;         //Notify the Main Application
    }                           //
Temperature = GetAdcResult();   // Read temperature of unit.
ifMainBattVoltage < V5_7){      // Is the Main Power close to gone?
    if (MainBattVoltage < V5_5) {// Is the Main Power gone?
        BUBOff();               // Stop Charging BUB.
        OffCounter++;           // Count how long off charge.
        if(OffCounter > 600){   // dec gas counter 1 per ~10 min
            CheckCounters();    //
        }                       //
    }else{                      // Power close to gone.
        BUBOn();                // Power will be gone soon.
    }                           //
}else if (Temperature > 50C) // Voltage O.K. - Are we too hot?
    BUBOff();                   // Stop charging
    OffCounter++;               // Count how long over 50C
    if (OffCounter > 14400){    // dec gas counter 1 per ~4 hours
        CheckCounters();        //
    }                           //
}else if (Temperature > T0C){// Is the battery too cold?
    BUBOff();                   // Stop charging.
}else}                          // Temp is OK. to charge
    ChargeCounter++;            // 1 sec counter. Rolls at 255 to 0
    if (ChargeCounter > 12){    // If not time to pulse charge.
        if (GasCounter == 255){ // Is the battery full?
            BUBOff();           // Yes. Stop charging.
        }else{                  // If not full we need charge.
            BUBOn();            // Turn on the BUB charger.
```

-continued

```
    }           //
}else{                  // If it is time to pulse charge.
    BUBOn();            // Charge for 12 sec every 4 min
    }
}
```

Backup battery circuit

The PIC16C74 micro controller should shut off the backup battery recharge circuit when the backup battery is full. This is to conserve power. Failure to shut off the backup battery charge circuit will drain the main battery at a rate of 2 times the current going into the backup battery.

The Hand-held data terminal of the present invention will only support Lithium Ion battery technology for the main battery packs. This is because Lithium Ion offers a higher voltage per cell, higher energy density per volume, and higher energy per volume than Nickel Cadmium or Nickel Metal Hydride. The Lithium Ion charging method is similar to Lead Acid charging like a person would do to a car battery. During the first stage of the charge cycle the power supply must limit the amount of current that is being allowed into the battery. After the first stage is done the power supply must limit the voltage on the cells. For our Lion cells the initial stage must limit the current to 1 Amp of current or less. After this stage the total voltage on the cells must not exceed 4.2 volts per cell.

Intelligent battery pack circuit

The battery is protected by a Poly-switch number SRP-350 NPN 301-917-001. The Pack checks the voltages of the cells for max. and min voltage compliance. The Resistor divider on the full battery voltage is 6.98K and 8.45K to ground (the ratio is 0.54764). The AtoD in the PIC16C71 is 255=5V, 0=0V. Each count therefore=0.01953.

External power

12V+/−2V DC at<2 A.

The Unit will run from an external power supply without a battery installed. The unit has an internal battery recharging circuit that is a 1.3 A Current Limited-8.4V Voltage Limited power supply that supplies power for the battery packs.

Keyboard Controller

The microcontroller used for keyboard control is a PIC16C74. It is mounted in a TQFP package and runs at 5 volts.

Key scanning

The PIC16C74 has a 8×8 key matrix.

Voltage readings

The PIC16C74 can read the voltage of the main battery terminal and the voltage of the backup battery. Appendix A and B are made a part of this specification.

APPENDICIES

Attached hereto are PEN*KEY 6400 Computer PROGRAMMER'S REFERENCE GUIDE as APPENDIX A, and PEN*KEY Model 6400 Hand-Held Computer USER'S GUIDE as APPENDIX B.

What is claimed is:

1. A portable hand-held data terminal, including:
   a display portion; and
   a keypad portion adjacent to said display portion, said keypad portion including:
      a top section having a curvilinear shape;
      a bottom section joined to said top section, said bottom section having a smooth, unobstructed curvilinear shape adapted to fit comfortably with a palm of a human hand so that a thumb and fingers of said human hand may wrap about said keypad portion; and
      a plurality of user activated keys extending from said top section to form a keypad, wherein said keypad may be operably manipulated by the thumb and fingers of said human hand to allow single handed operation of said portable data terminal wherein said plurality of user-activated keys includes one or more first function keys, a plurality of second function keys, and a plurality of third function keys, and wherein said one or more first function keys protrude farthest from said top section, said second function keys protrude next farthest from said top section, and said third function keys protrude least farthest from said top section so that said one or more first function keys, said second function keys, and said third function keys may be distinguished by touch.

2. The portable hand-held data terminal of claim 1, wherein a face of at least one of said plurality of keys is curved so as to be more easily manipulated by the thumb and fingers of said human hand during single handed operation of said portable hand-held data terminal.

3. The portable hand-held data terminal of claim 2, wherein said keys extend to at least two different heights above said top section so that said keys may be tactually distinguishable by the fingers of said human hand.

4. The portable hand-held data terminal of claim 2, wherein said keys are grouped on said top section according to their height.

5. The portable hand-held data terminal of claim 2, wherein said keys have at least two different sizes so that said keys may be tactually distinguishable by the fingers of said human hand.

6. The portable hand-held data terminal of claim 2, wherein said keys are grouped on said top section according to their size.

7. The portable hand-held data terminal of claim 2, wherein the face of said at least one key curves convexly from a lowest point with respect to said top section to a highest point with respect to said top section, and wherein said lowest point is disposed toward the side of said top section and said highest point is disposed toward the center of said top section.

* * * * *